US009224107B2

(12) United States Patent
Hoff et al.

(10) Patent No.: US 9,224,107 B2
(45) Date of Patent: Dec. 29, 2015

(54) MANAGING CUSTOMIZING SETTINGS IN A BUSINESS STRUCTURED INTERFACE

(75) Inventors: Roland Hoff, Waldorf (DE); Roland Keil, Ubstadt-Weiher (DE); Almer Podbicanin, Mannheim (DE); Karsten Hartmann, Angelbachtal (DE); Robert Baethe, Heidelberg (DE)

(73) Assignee: SAP SE, Walldorf (DE)

( * ) Notice: Subject to any disclaimer, the term of this patent is extended or adjusted under 35 U.S.C. 154(b) by 1579 days.

(21) Appl. No.: 12/569,250

(22) Filed: Sep. 29, 2009

(65) Prior Publication Data

US 2011/0078606 A1    Mar. 31, 2011

(51) Int. Cl.
G06F 3/048 (2013.01)
G06Q 10/00 (2012.01)

(52) U.S. Cl.
CPC .................................. G06Q 10/00 (2013.01)

(58) Field of Classification Search
USPC .......................................................... 715/771
See application file for complete search history.

(56) References Cited

U.S. PATENT DOCUMENTS

| | | | |
|---|---|---|---|
| 6,222,465 B1 * | 4/2001 | Kumar et al. | 341/20 |
| 6,963,901 B1 * | 11/2005 | Bates et al. | 709/206 |
| 8,069,096 B1 * | 11/2011 | Ballaro et al. | 705/27.2 |
| 2005/0198000 A1 * | 9/2005 | Rapp | 707/1 |
| 2006/0190486 A1 * | 8/2006 | Zhou et al. | 707/104.1 |
| 2006/0265706 A1 * | 11/2006 | Isaacson et al. | 717/174 |
| 2008/0028389 A1 * | 1/2008 | Genty et al. | 717/174 |
| 2009/0037310 A1 * | 2/2009 | Claypoole et al. | 705/35 |
| 2009/0150831 A1 * | 6/2009 | Young et al. | 715/845 |
| 2010/0318395 A1 * | 12/2010 | Corneil et al. | 705/8 |
| 2011/0145031 A1 * | 6/2011 | Basu et al. | 705/7.13 |

OTHER PUBLICATIONS

'Business Process Management with SAP NetWeaver' [online]. SAP, 2004, [retrieved on Aug. 25, 2009]. Retrieved from the Internet: <URL: http://www.sap.com/platform/netweaver/pdf/BWP_NetWeaver_BPM.pdf>, 4 pages.

* cited by examiner

Primary Examiner — Ajay Bhatia
Assistant Examiner — Haimei Jiang
(74) Attorney, Agent, or Firm — Fish & Richardson P.C.

(57) ABSTRACT

Among other disclosed subject matter, a computer-implemented method of managing customizing settings in a business structured interface is to be initiated. The method includes presenting a plurality of business process types to a user. Each of the business process types includes a plurality of business document types. First user input selecting a set of business process types is received. The first user input triggers for each selected business process type activation of features in an application program. In response to the first selection, the plurality of business document types associated with the selected business process type are presented. Second user input selecting a set of business document types is received. The second user input triggers activation of features in the application program. The application program is launched, wherein the features are activated and available during the operation of the application program.

18 Claims, 6 Drawing Sheets

MANAGING CUSTOMIZING SETTINGS IN A BUSINESS STRUCTURED INTERFACE

TECHNICAL FIELD

This document relates to a management of customizing settings.

BACKGROUND

Some business software application programs provide functions that cover the specific needs of several different organizations. Such standard business software can include customer relationship management (CRM) and enterprise resource planning (ERP) software. Development of standard business software can reduce the total cost of ownership (TCO) for individual companies. For example, a company can purchase a CRM system and activate only those features needed by the specific company. Purchasing this larger package of features and selectively activating desired functions can be cheaper than developing an application program specific to the needs of the company. Furthermore, companies using standard business software system can readily activate or deactivate features as the company changes in size and structure.

To ensure the same specificity as individually developed business software, a large amount of customizing settings are required in standard business software. Every organization using the business software may be required to set the customizing settings. Because of the significant amount of flexibility in the business software required for use by many organizations, setting customizing settings can be a very time-intensive process and can be a considerable part of the costs of implementing the business software for an organization.

SUMMARY

In a first aspect, a computer program product is tangibly embodied in a computer-readable storage medium and includes instructions that when executed by a processor perform a method for managing customizing settings for an application program. The method includes presenting, in a computer system, a plurality of business process types to a user. Each of the business process types are configured for execution in the computer system to perform a predefined business operation and include a plurality of business document types. The method includes receiving a first user input selecting a set of business process types from the presented plurality of business processes types. The first user input triggers for each selected business process type activation of first corresponding features in an application program that are associated with the selected business process type. The method includes presenting, in response to the first selection, the plurality of business document types associated with the selected business process type. The method includes receiving a second user input selecting a set of business document types from the presented plurality of business document types. The second user input triggers for each selected business document type activation of second corresponding features in the application program that are associated with the selected business document type. The method includes launching the application program in the computer system and in response to the first and second inputs. The first and second corresponding features are activated and available during operation of the application program. Other features not associated with at least one of the selected set of business process types and the selected set of business documents are not activated and are not available during the operation.

Implementations can include any or all of the following features. The method can include receiving a third user input of a selected business process type. The third user input can initiate the presentation of the plurality of business document types. The first user input can include selections of check boxes for the selected set of business process types and the third user input can include selection of a link for navigating to a presentation of the plurality of business document types for the selected business process type. The link can be activated for user-selection in response to selection of the checkbox associated with the selected business process. The presentation of the plurality of business document types can replace the presentation of the plurality of business process types so that the plurality of business process types are no longer displayed to the user. The set of business process types can include a single business process type. The set of business document types can include a single business document type. Triggering for each selected business process type activation of first corresponding features in an application program can include modifying settings in a customizing table accessed by the application program, the settings accessed by the application program to activate and deactivate application program features. Modifying settings in the customizing table can occur after the selection of the set of business process types and in response to the receipt of a third user input that is not a selection of a business process type. The business document type can be a template for generation of a business document instance of the type by the application program in response to a user of the application program performing the predefined business operations of the business process associated with the business document. Each of the business documents can comprise a plurality of tasks. The method can include presenting, in response to the second user input, the plurality of tasks associated with the selected business document type. The method can include receiving a third user input selecting a set of tasks from the presented plurality of tasks, the third user input triggering for each selected task activation of third corresponding features in the application program that are associated with the selected task. The method can include launching the application program in the computer system and in response to the first, second, and third inputs. The first, second, and third corresponding features can be activated and available during operation of the application program. Other features not associated with at least one of the selected set of business process types, selected set of business documents, and the selected set of tasks can be not activated and not available during the operation. The method can include presenting, in response to the first selection, a plurality of tasks associated with the presented plurality of business document types. The plurality of tasks can include one instance of all tasks associated with the plurality of business document types and not include duplicates of any tasks. The method can include receiving a third user input de-selecting a set of business document types from the presented plurality of business document types, the deselected set of business document types initially activated by the first user input. The method can include presenting, in the computer system, a plurality of business roles to the user. Each business roles can be associated with a plurality of the business process types. A business role can be associated with a group of users of the application program. The method can include receiving a third user input selecting a set of business roles from the presented plurality of business roles. The presentation of the plurality of business process types can be presented in response to receiving the third user input selecting the set of business roles.

In a second aspect, a computer program product tangibly embodied in a computer-readable storage medium can include instructions that, when executed, generate on a display device a graphical user interface for managing customizing settings for an application program. The graphical user interface can include a first screen presenting a plurality of business processes, corresponding business process activation elements, and corresponding business process links. Each business process can be associated with a plurality of business documents. Each business process activation element can be adapted to receive user-selection of the business process activation element. User-selection of the business process activation element can activate features in an application program that are associated with the selected business process. Each business process link can be adapted to receive user-selection of the business process link. User-selection of the business process link can display a screen listing the business process' business documents. The graphical user interface can include a second screen presenting a plurality of business documents, corresponding business document activation elements, and corresponding business document links. The second screen can be displayed in response to user-selection of a business process link. The plurality of business documents can be the business documents for the business process for which the business process link was selected. Each business document can be associated with a plurality of tasks. Each business document activation element can be adapted to receive user-selection of the business document activation element. User-selection of the business document activation element can activate features in the application program that are associated with the selected business document. Each business document link can be adapted to receive user-selection of the business document link. User-selection of the business document link can display a screen listing the business document's tasks. The graphical user interface can include a third screen presenting a plurality of tasks and corresponding activation elements. The third screen can be displayed in response to user-selection of a business document link. The plurality of tasks can be the tasks for the business document for which the business document link was selected. Each task activation element can be adapted to receive user-selection of the task activation element. User-selection of the task activation element can activate features in the application program that are associated with the selected task. The activation of the features can be achieved by modifying settings in customizing tables that are accessed by the application program to determine features that should be activated and deactivated in the application program.

In a third aspect, a computer program product tangibly embodied in a computer-readable storage medium includes instructions that when executed by a processor perform a method for managing customizing settings for an application program. The method includes presenting, in a computer system in a first display of a display device, a plurality of business process types to a user. Each of the business process types are configured for execution in the computer system to perform a predefined business operation and comprise a plurality of business document types. The method includes receiving a first user input selecting a business process type from the presented plurality of business processes types. The method includes presenting, in response to the first user selection and in a second display of the display device, the plurality of business document types associated with the selected business process type. Each of the plurality of business document types includes a plurality of tasks. Each task is associated with a feature. The presentation of the plurality of business document types in the second display replaces the presentation of the plurality of business process types in the first display so that the plurality of business process types are not displayed to the user. The method includes receiving a second user input selecting a business document type from the presented plurality of business document types. The method includes presenting, in response to the second user selection and in a third display of the display device, the plurality of tasks associated with the selected business document type. The presentation of the plurality of tasks in the third display replace the presentation of the plurality of business document types in the second display so that the plurality of business document types are not displayed to the user. The method includes receiving third user input selecting a set of tasks from the presented plurality of tasks. The third user input triggers for each selected task activation the selected task's feature in the application. The method includes launching the application program in the computer system. The features for the selected set of tasks are activated and available during operation of the application program. Other features not associated with at least one of the selected set of tasks are not activated and are not available during the operation.

Implementations can include any or all of the following features. Each task can include a plurality of settings that specify application program behavior related to the feature associated with the task. Activation of the selected tasks' feature in the application program can maintain the plurality of settings in corresponding customizing tables that specify the application program behavior related to the feature associated with the task. The modification of settings in the customizing table can occur after the selection of the set of tasks and in response to the receipt of a forth user input that is not a selection of a task. The method can include presenting, in the computer system in a third display of the display device, a plurality of business roles to the user. Each of the business roles can be associated with a plurality of the business process types. A business role can be associated with a group of users of the application program. The method can include receiving a third user input selecting a business role from the presented plurality of business roles. The presentation of the plurality of business process types can be presented in response to receiving the third user input selecting the business role. The presented plurality of business process types can be the business process types associated with the selected business role. The selected set of tasks can include a single task.

The described subject matter may provide one or more benefits, such as reducing the cost of implementation and implementation time for business software. The implementation or modification of settings may not require an individual specially trained in business software implementation. Customizations dependent upon activation of other features can be hidden from display until the parent features are activated. Implementation can be simplified and made conceptually easy to understand.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes examples for managing customizing settings in an application program. In some implementations, a customizing application is used as a tool to activate features in an application program by managing customization settings. The customizing application can be adapted to present a set of views, where a display of some of the views is dependent upon the user activating features in an earlier view.

Figure 1:
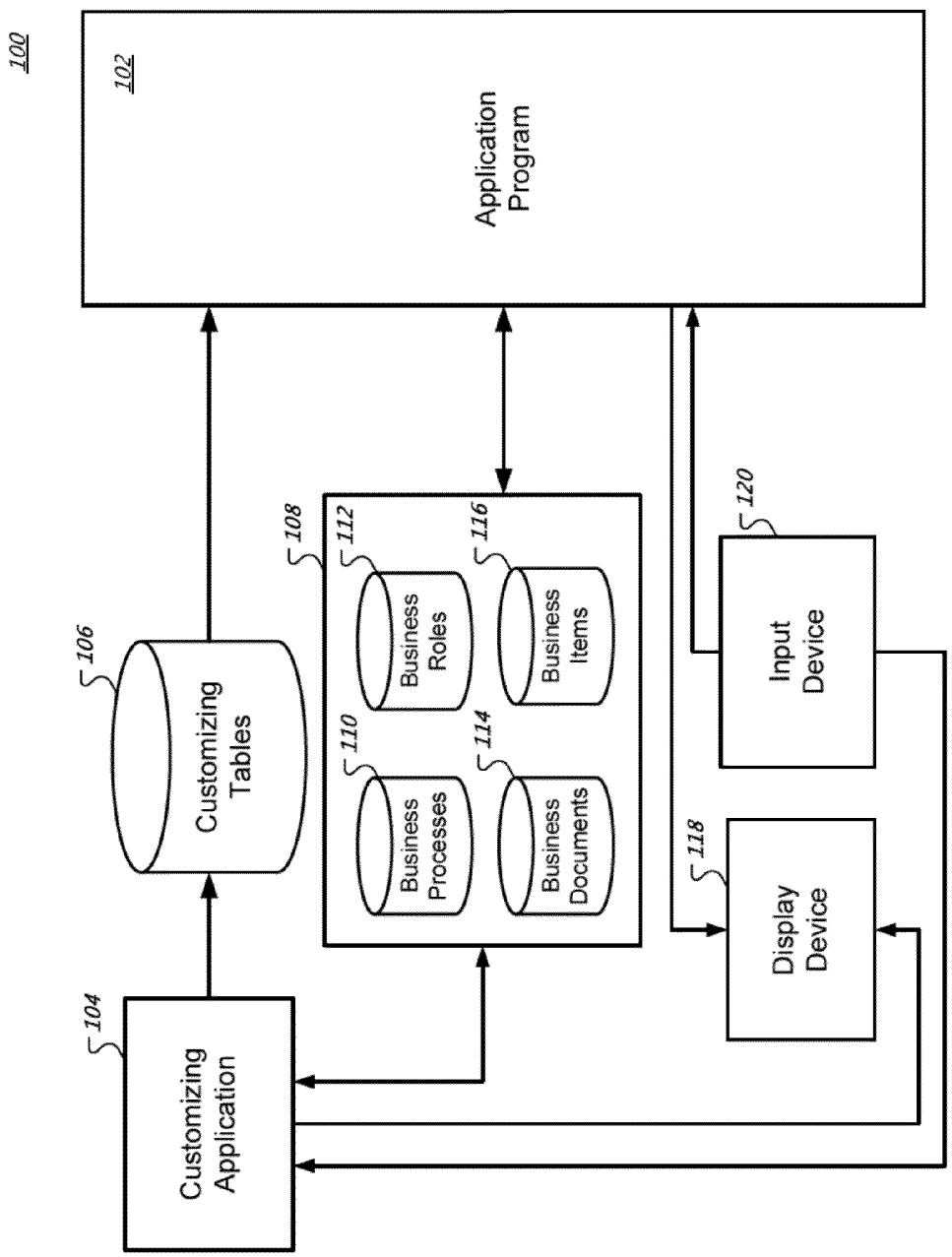
FIG. 1 is a block diagram representing an example system for managing customizing settings.

FIG. 1 is a block diagram representing an example system for managing customizing settings for an application program. In some implementations, the application program 102 is standard business software such as customer relationship management (CRM) or enterprise resource planning (ERP) software. CRM software can support processes involving direct customer contact throughout a customer relationship life cycle (e.g., from market segmentation, sales lead generation and opportunities, to post-sales, and customer service). Typical business functions that include a CRM system are sales and marketing, customer service, customer contact, and call center support.

Enterprise resource planning software is a company-wide computer software system used to manage and coordinate the resources, information, and functions of a business from shared data stores. Typical business functions that include an ERP system are manufacturing, supply chain management, financials, project management, human resources, data warehouse, and access control. In some scenarios, CRM functions are considered a subset of an ERP system. In some instances, a software package is considered an ERP system if the software package provides the function of at least two systems. For example, a software package that provides both payroll and accounting functions could be considered an ERP software package. An ERP or CRM system can be associated with several application programs operated or accessed by the systems. In this document, the term application program can describe a collection of applications operating together as part of an ERP, CRM, or similar multi-use business software program.

The application program 102 can include a large set of features applicable to an entire industry or set of industries, and perhaps more features than are necessary for a single organization. A desired subset of features from the set are activated during an implementation procedure to set up the application system at a customer site. The overall implementation procedure aims to adjust company-neutral and industry-specific functions to the requirements of a specific company. For example, the application program 102 may offer functions to assist with financial accounting, human resources, building access control, and product manufacturing. A design agency using the application program 102 may only need the financial accounting and human resources functions, not the building access control or product manufacturing functions. The system can be configured accordingly during the implementation stage.

The customizing application 104 provides a user interface to aid in the implementation of the application program 102.

As an illustration, the customizing application 104 can access a list of functions 108 offered by the application program 102 and present graphical user interfaces on a display device 118 to facilitate user-selection of desired features. An input device 120 can be used by a person to select and activate specific features.

The activation of features in the application program 102 is achieved by modifying settings in a customizing table 106. The customizing tables includes settings that govern how the application program operates and what functions are available to users of the application program. At a basic level, the customizing tables can define the time, currency, type of calendar, and country for the application program. At a more specific level, enhanced functions are activated by changing settings in the customizing table (e.g., by setting flags in a database that stores the customizing tables). Customizing settings can be stored in tables in a database, within a file accessed by the application program 102, or as settings in a computer registry, to name a few examples.

Before flags or customizing settings are activated, a user may be able to open the application program but not perform any functions or be limited in the functions that the user can perform. Upon activation of specific settings, a user can use certain features of the business program that are associated with the settings. For example, a business document may be associated with a set of flags in the customizing table. Activation of the set of flags can enable features in the application program that are associated with the business document. The use may be able to create, edit, or view documents that are enabled. Activated processes can be associated with the presentation of a user interface that guides the user in using documents enabled for the process. Those features not associated with concepts activated in the customizing application may not be activated and not available during the operation of the application program.

Directly modifying settings in the customizing tables can be time intensive and require substantial technical training and experience of implementing application programs for various customers. The customizing application 104 provides a layer on top of the customizing tables that enables relatively inexperienced users to activate and maintain settings for the application program 102 without extensive training.

In some implementations, the customization of the application program's features depends upon business processes, business roles, business documents, and business items associated with the application program 102. These concepts (defined in more detail below) can be dependent upon another. As an example, several business processes may be associated with a business role, several business documents may be associated with one of the business processes, and several business items may be associated with one of the business documents. This "nesting" or hierarchical relationship between the roles, processes, documents, and items facilitates the creation of a user interface that filters the display of roles, processes, documents, and items depending on the activation of parent concepts. The display of these concepts is described with more detail in reference to FIGS. 2-4.

The application program 102 can be associated with several business processes. A business process is a set of logically related activities which are performed within or across an organization to achieve a defined business outcome. For example, a business process can serve a specific business purpose, such as "purchasing goods" or "order processing." Business processes are usually carried out within one organizational department and supported by features within the application program 102. User workflows relating to a specific business process can be associated with a set of functions in the application program that follow the business process workflow. Example business processes can include "Creating Customer Complaints," "Initiative to Encourage Customers to Upgrade their Accounts," "Lead and Opportunity Management," "Sales and Quotation Management," "Campaigns," "Sales," "Delivery," and "Invoices."

As an illustration, an "order processing" business process can cover activities related to receiving the order through shipping and invoicing. Another illustration can include an "activity management" business process. The activity management business process can be associated with all activities undertaken by a company's employees. For example, activation of the activity management business process can enable all relevant employees to access necessary information saved in activities (i.e., business activities and tasks). For example, sales representatives can use Activity Management functions to view the outcome of a telephone call to a customer, and sales managers can quickly and easily gain an overview of all the activities that have taken place in the department during a certain period of time. A business process can be referred to as a business process type.

The application program 102 can be associated with several business documents 114. In some implementations, a business document is a type of electronic document that can provide information regarding a specific task or concept and record information regarding the same. A business document can provide a template for the generation of instances of the document. Example business documents can include "sales orders," "meeting requests," "purchase orders," "customer complaints," "internal program notification," "general ledger accounting department," "customer invoice," "customer payment," "assembly bill of materials," and "sales bill of materials."

A template of a business document can be referred to as a business document type and individual instances of business documents can be referred to as business documents. In some implementations, business documents can be electronic business objects. A business object defines the structure and fields for instances of the business object. Each business document can include fields or attributes for storing information. In some implementations, activation of a business document is associated in the application program with the activation of settings for a business document type.

In some implementations, each business document (and instances of the business document) includes a document header and line items. The document header is the part of the document that contains information valid for the whole document, e.g., document date and number. The document header can also contain controlling information, such as the document type. The line items are the parts of the document that contain information about items. Example items can include an account number, an account credit, an account debit, an assignment, and additional details specific to a transaction being posted. Other example items can include terms of payment, a cost center, or explanatory text. Each item may define a field, where specific values for the field are entered at runtime by the application program 102 or a user of the application program 102.

Each business process can be associated with one or more business documents. Conversely, a business document can be associated with several business processes. As an illustration, an "Order-to-Cash" business process may involve the end-to-end logistics from receiving a sales order from a customer, through shipping the product, and through receiving payment. The Order-to-Cash business process can include or be associated with several business documents including "sales orders," "outbound shipments," "billing data," "delivery notes," "customer invoices," "incoming payments," and others. The "sales orders" business document may not only be associated with the Order-to-Cash business process, but other business processes as well.

The application program 102 can be associated with a set of business roles 112. Business roles 112 are assigned to users of an organization that are associated with groups of activities. For example, sales, service, or marketing can all be business roles. Individuals within the sales, service, and marketing departments may belong to their respective roles. For example, when a user logs into the application program, he or she can either select to log in under a role or be pre-associated with a role. Functionality available to the user may depend on the role.

In some implementations, several business processes or business documents are associated with a specific role. For example, a user of the marketing business role may be able to access a "image development" business process and a "networking" business process," but not an "order-to-cash" business process. The marketing user may have access to most business documents within the "networking" business process, with the exception of the "employee personal information" business document. A user of the human resources business role may also have access to the "networking" business process and may be able to access the "employee personal information" business document, but may be unable to access the "strategic planning" business document.

The application program 102 can be associated with several manufacturer-provided business concepts (e.g., the processes 110, roles 112, documents 114, and items 116). Additional business concepts may be created or defined by users of the application program 102 or obtained from other sources (e.g., Internet websites, third-party suppliers of concepts, or other concepts separately provided by the software manufacturer).

In some implementations, business concepts are arranged into conceptually related categories. For example, a "customer comments" business document category can include the business documents "customer complaints," "customer suggestions," and "customer complaints against vendor." In some implementations, a business document category has only a rough influence on the software functionality in order to allow a high level of flexibility of the constituent document types. For example, the category can provide an initial selection for searching, displaying or creating a certain type of business document. The concept types can be predefined by the software provider to roughly influence the functionality of the specific concepts (e.g., specific documents or items).

Figure 2:
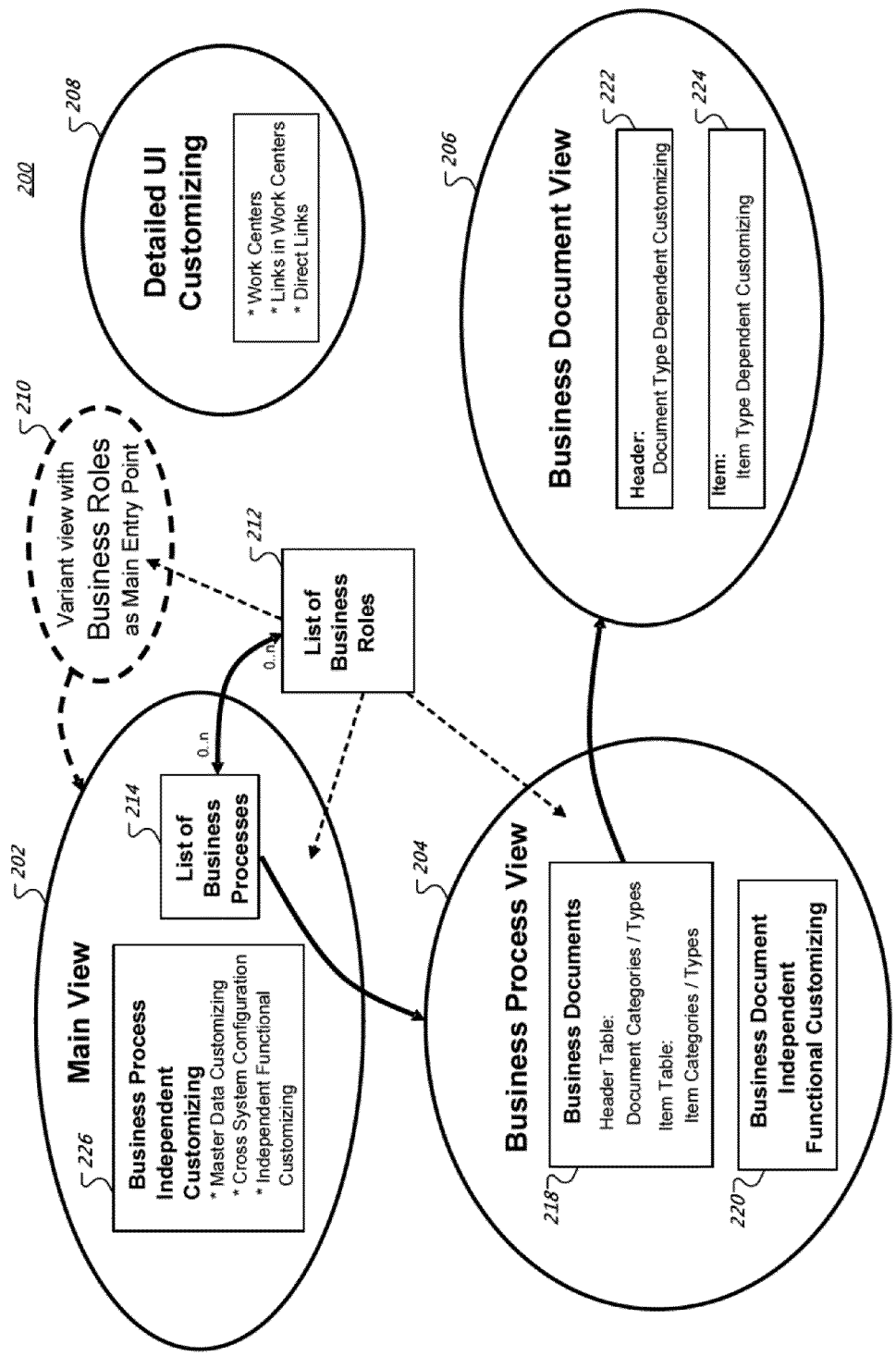
FIG. 2 is a diagram schematically illustrating presentation of information in an example system for managing customizing settings.

FIG. 2 is a diagram 200 schematically illustrating presentation of information in an example system for managing customizing settings. A set of different "views" or screens are presented by the customizing application 104 to a user of the customizing application that is maintaining application program 102 settings. Each view can present information for one level in a hierarchical categorization of business concepts. For example, the "Main View" 202 can present a list of business processes. The "Business Process View" 204 can present a list of business documents in response to a selection of one of the business processes. The "Business Document View" 206 can present a list of items and document-specific information in response to a selection of one of the business documents within the business process view 204.

The information displayed in a business process view 204 and the business document view 206 can be dependent on previously activated business concepts (i.e., business concepts from which they depend). Further, although several business processes in the list 214 may be activated, the business process view 204 may only display information about one of the business processes at a time.

As an illustration, the main view 202 may be the first view displayed to a user of the customizing application 104. The view may provide a list of business processes 214 that are associated with the application program 102. In this view, the user is allowed to select or activate some or all of the displayed business processes. The user may select the business processes by clicking on a "check-box" next to each business processes. The check-box selection indicates that settings in the customizing table 106 should be modified to activate functions associated with the business process in the business process 102.

The activated functions may be "default" functions for a business process. A user may be able to open the application function and access basic functionality associated with the business process after activation of the functions. Activation of additional features within the business process or refinement of the default settings may require additional user-input. This user input can be received by tunneling into the business process and further refining settings of business documents (e.g., within the business process view 204 or the business document view 206).

The main view 202 can also display a link for each business process in the list 214. Selection of a business process' link can result in navigation to the business process view 204. The business process view 204 can display information specific to the selected business process. For example, the business process view 204 can display all the business documents 218 associated with the business process from a larger set of business documents associated with all the processes in the list 214. In some implementations, a link for a business process is only available or activated once the check-box for the business process has been clicked on.

As an illustration, if a link to the "Order-to-Cash" business process is selected in the list of business processes 214, the business documents list 218 can include a list of the business documents "sales orders," "outbound shipments," "billing data," "delivery notes," "customer invoices," and "incoming payments." Like with the business processes, a user can activate a specific business document by selecting a check box for the document. A user may view more detailed information about the document or refine the activation of document-specific features by selecting a link associated with the document.

In some implementations, the business documents are grouped according to their business document categories. The business document categories may be activated by selection of a check box. Such category activation may activate all the documents in a category. In some examples, instead of a check box, each concept is associated with a radio button or some other activation element that visibly indicates that the concept has been selected by a user.

Each business document is associated with at least one item. In some implementations, the items are displayed in the business document view 206 (as discussed below). However, in some implementations, every item in all the business documents 218 can be presented in the business process view 204. Duplicate items can be removed. Displaying all the items for several business processes can avoid activation of the same item in several documents. For example, if several of the documents 218 include a "seller" item, the item can be activated in all business documents with one selection in the business process view 204. The activation can be propagated to each of the appropriate business documents.

A business document view 206 can be displayed in response to the selection of a business document's link. The business document view 206 can display information specific to the selected business document, allow a user to activate features associated with the particular business document, and allow a user to refine default settings previously activated for the business document. The activation settings can be associated with the entire document 222 (i.e., "Document Type Dependent Customizing") or can be associated with specific items 224 within the document (i.e., "Item Type Dependent customizing"). In some implementations, activation of an item in a business document view 206 for one business document does not activate the item for another business document.

In some implementations, customization is required that is not dependent on any particular business processes or business document. User interface elements for performing such customization can be provided to the user in one of the views 202, 204, and 206. For example, business process independent customizing 216 can be provided to the user in the main view 202 and may enable customization regarding information that does not depend on any particular business process. As an illustration, a user may set cross system configuration settings 226. These settings can synchronize one application program (e.g., a CRM application program 102) with another application program (e.g., an ERP application program).

Business document independent functional customizing 220 enables customization of settings that are dependent on a selected business process but not on any specific business document 204. For example, a business process view 204 for the "Order-to-Cash" business process may include independent customizing 220 that defines a "taxing jurisdiction" for the business process. In some examples, the taxing jurisdiction may not be included in or used by any of the business document 218. Another business document independent functional customizing 220 can include the priority of items shared among the business process. For example, "visit customer" items may be prioritized before "phone call" items.

In some implementations, the customization includes the activation of business roles. A view 210 providing a list of business roles can be displayed prior to the main view 202. In other words, the main view 202 can become dependent on the business roles view 210. Upon user selection of a business role in the view 210, the main view 202 can be displayed and include a list 214 of those business processes specific to the business role.

In other implementations, the main view 202 displays both a list of business processes 214 and a list of business roles 212. A business process may be associated with several business roles and a business role may be associated with several of the business processes. However, views of the business roles and processes are not dependent on each other, in these implementations. As an illustration, the "Order-to-Cash" and "Networking" business processes are be associated with the "Manufacturing" and "Sales" business role. If only the "Order-to-Cash" business process is activated and the "Manufacturing" business role is activated, a user logging in under the "Manufacturing" role will see "Order-to-Cash" business functions activated. The user will not see the "Networking" functions activated. The user also cannot log in under the "Sales" business role. This co-location and activation of business processes and roles contrasts implementations where a user must activate a business role and in a separate view activate business processes for the activated role.

In some implementations, a list of business roles is displayed in the business process view 204. A business process view 204 for an activated business process can identify specific business roles for which the displayed business process may be activated. Thus, instead of a display of business processes as dependent on selected business roles (for example as in the implementation with the variant main entry 210), the business roles are dependent on the list of business processes. The only business roles available to a user of the application program are those selected in business process views 204 for different business processes.

In some implementations a detailed user interface customizing view 208 allows customization of the user interface for different business roles. For example, a customer may want to have direct links for the creation or search of special business documents within certain business roles. These customizations, along with the different implementations of navigation through the views 202, 204, 206, and 210, can be customized in customizing view 208. The user interface customization 208 can allow definition of business role specific work centers.

In some implementations, the lists of business processes 214 and business documents 218 do not include separate check boxes and links. As an illustration, the list of business processes may not include check boxes. Selection of a business process link brings a user to the view business process view 204 for the selected link. The business process may be activated upon this selection, or may be activated only if activations are performed in the business process view 204 (e.g., if a business document is activated).

In some implementations, customization settings are changed immediately upon activation of a business role, process, document, or item. Such immediate modification enables a user to open the application program 102 and see how the current settings affect operation of the application program 102. In some implementations, modifications to settings can be changed as the application program 102 is running, affecting the features available to a user of the application program during runtime. In some implementations, the main view 202 and the business process view 204 do not provide for activation of features but allow for navigation to the business document view 206 where a user may activate features.

In some implementations, links do not provide direct access to the business process view 204 for specific business processes. Instead, a user may activate the desired business processes in the list 214 (e.g., by selecting check boxes). Upon activating all the business processes a user may indicate completion (e.g., by selecting a "Done" button). The customizing application 104 may then present a business process view 204 for one of the business processes. Upon completion with the business process (e.g., by selecting a "Next" button), a next business process view 204 for a next selected business process can be selected. In some implementations, the settings for several business processes selected from the list 214 is displayed at a single time in the business process view 204.

In some implementations, the business process view is displayed separately and at a different time than the main view 202. For example, the main view 202 may be displayed on a computer monitor, filling the entire screen. Upon navigation to the business process view 204 (e.g., by selecting a business process link), the entire screen is replaced by the business process view 204. In some implementations, the main view 202 is displayed in a window of an operating system. The window may be moved around, maximized, and minimized. Upon navigation to the business process view 204, another window may appear for the business process view 204. In some examples, the other window may replace the business process view 204 or the content in the window for the main view 202 may be replaced in the window by content for the business process view 204. The main view 202 may disappear or lose focus to the business process view 204. In some implementations, a user cannot access or view more than one view at a time on the display device.

Figure 3:
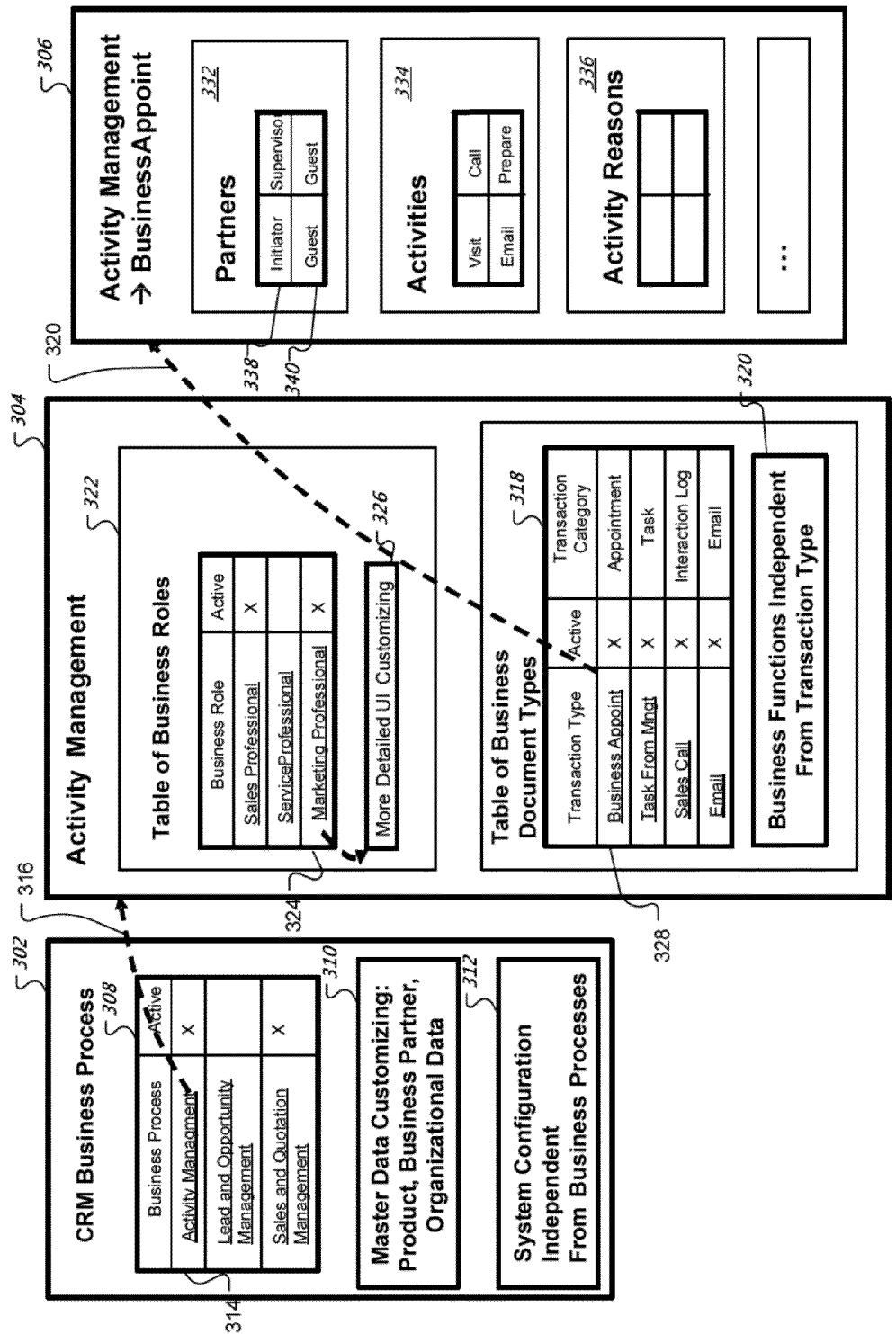
FIG. 3 is a depiction of example screens of a system for managing customizing settings.

FIG. 3 is a depiction of example screens of a system for managing customizing settings. The screens display an example one of many potential navigations through the displays of a customizing application 104. In this illustration, the CRM Business Processes screen 302 is an example display of the "Main View" 202. The Activity Management screen 204 is an example display of the Business Process View 204. The Activity Management→Business Appointment screen 306 is an example display of the Business Document View 206.

In this illustration, the main view 302 presents the user with a list of available business processes 308, master data customizing 310, and system configuration independent from business processes 312. The system configuration 312 settings can provide the business process independent settings described above with regard to the business process independent customizing 216. From the list of business processes 308, the user has selected to activate the "Activity Management" and "Sales and Quotation Management" business processes by clicking on the check boxes to the right of the business process text.

The user wishes to activate more detailed customization settings for the "Activity Management" business process, and thus clicks on the link 314. The arrow 316 indicates the transition to the display of an activity management screen 304 upon the selection of the link 314. The activity management screen 304 can be an example of the business process view 204. In this implementation, the activity management screen 304 not only includes a list of business document types 318 and a list of business functions independent from transaction type 318, but also includes a list of business roles 322.

As displayed in the screen 304, two of the business roles have been activated and all four of the business document types have been activated. The activations may be default settings that occur upon activation of the activity management business process in the business process screen 302. The activations also may have been selected by the user. In this example, the activated default settings may not be shown to the user in the screen 304 or may be shown or available for modification as part of the business functions independent from transaction type 320.

The displayed business roles 322 may be only those business roles 322 valid for the selected activity management business process. Selection of the link 324 for a business role can provide the user with More Detailed User Interface Customizing 326. The more detailed customizing can show associations between the business role and business document and business items. The customizing display 326 may appear in another screen or as a portion of the screen 304.

The documents in the list of business document types 318 can also be called "Transaction Types." In this example, the list 318 includes a "Business Appointment," a "Task from Management," a "Sales Call," and an "Email" transaction type. The category of the transaction type is displayed for user reference to the right side of the list 318. All four of the transaction types are activated, however, the user has selected the business appointment link 328 and navigated to a business appointment screen 306 (as indicated by the arrow 320).

The business document view is here an "Activity Management, Business Appointment" screen 306. The screen can display information and allow activation for settings that are common to the document. The screen can also display items. In this example the items are grouped by category. There is a "Partners" category 332, an "Activities" category 334, and an "Activity Reasons" category 336. The screen can also include a back button to return to the previous view or screen.

Each "Partner" item (e.g., partner items 338 and 340) can identify an individual associated with the business appointment document. As an illustration, a "Sales Order" business document may include a category of "Partner" tasks. The tasks in the category can include a "ship to," a "product receiving party," a "payer," and an "employee responsible" task. The term task and item may be used interchangeably.

A user of the customizing application can activate specific items or add additional items. For example, a user may add an "invoice receiving party" task to the "Partners" category and activate only the "ship to" task from among the pre-existing tasks. Thus, a user operating the CRM system and attempting to create a sales order may only see fields for "invoice receiving party" and "ship to." The fields can be filled out by the user of the CRM system or filled out by the CRM system using data mining operations.

As an illustration, settings assigned to each partner item may specify behavior of the CRM system for features associated with the partner item. For example, a partner item may allow identification by a user of the customizing application of a maximum number of partners that can be associated with a business document. If a user customizing the CRM program entered the number five in a field associated with the maximum number of partners item, a user of the CRM program may be unable to associate more than five partners with the business document. Another partner item may specify an "Access Sequence" for partner determination." The user of the customizing application may be able to manipulate the contents of a filed that is associated with the access sequence. Manipulation can impact settings in a customizing table that affects the behavior of automatic partner determination for some of the partner items. For example, the customizing user can impact how a partner is automatically selected as the "payer" of a business document when the business document is created in the CRM system. The customizing table for the access sequence can be different than a customizing table for the maximum number of users item.

The activities category 334 can include specific activities associated with the business document. For example, the activities "visit," "telephone call," "email," "reminder to call customer," and "prepare for sales visit" can be associated with the "business appointment" business document. Each of the activity tasks can be associated with one or more of the partners. For example, the "visit" activity can be associated with an "initiator" partner 338 and a "guest" partner 340.

The activity reasons category 336 describes interrelationships between a process and specific tasks. Each task can provide a process to relate the task and the process together. For example, sales orders can be identified as related to customer complaints. The activity reasons tasks can also describe what triggered an activity. For example, a call may have triggered a visit that is associated with a business appointment.

Figure 4:
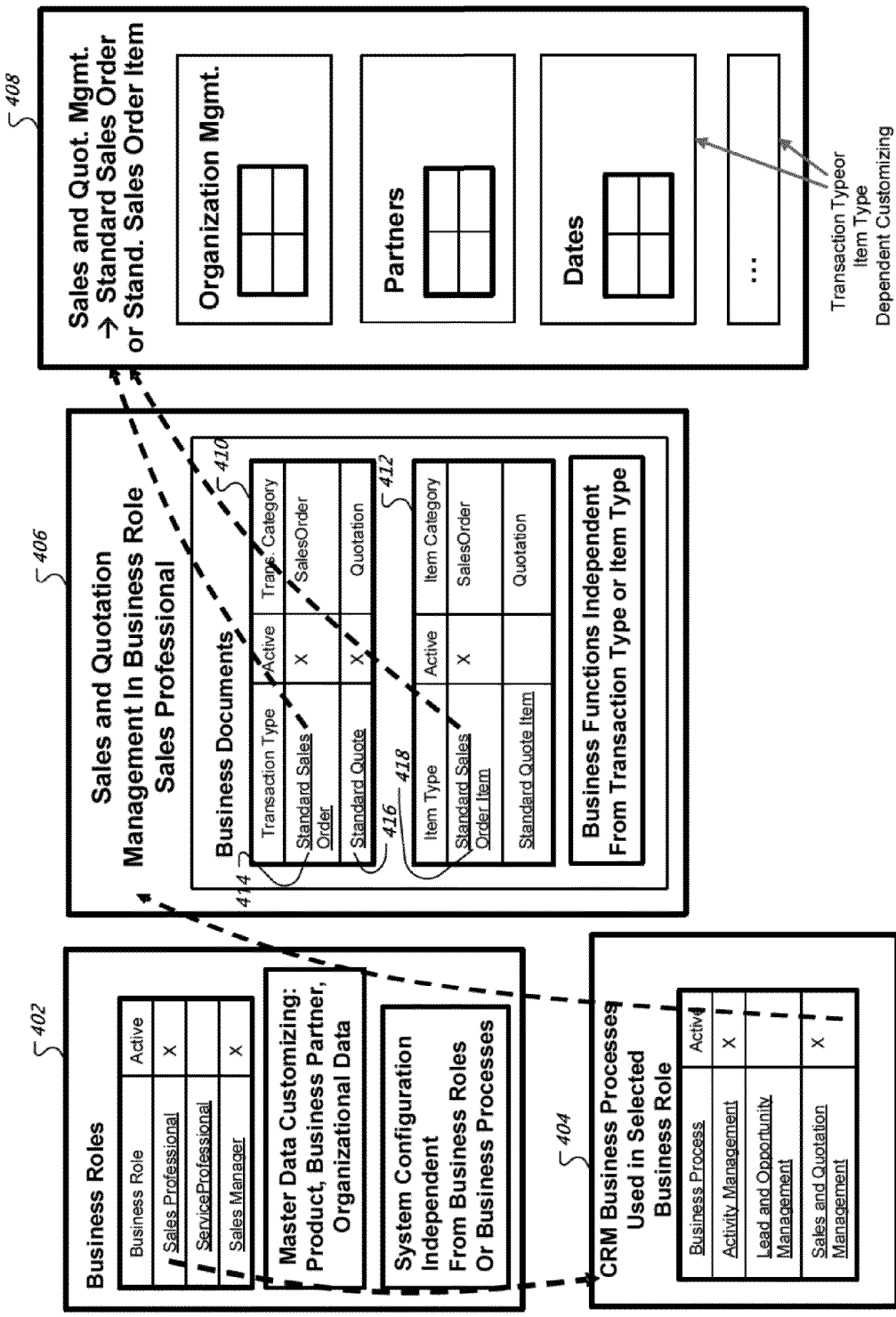
FIG. 4 is another depiction of example screens of a system for managing customizing settings.

FIG. 4 is a depiction of example screens of a system for managing customizing settings. The set of views illustrated in FIG. 4 include some differences from the views displayed in FIG. 3 and provide for a different navigation in customizing the application program. Both FIGS. 3 and 4 include a set of views for user-navigation through a set of user interfaces in the customization of the application program. In FIG. 4, however, the first view provided is a "Business Roles" view 402. This screen can correspond to the variant view 210 in FIG. 2. Because the business roles view 402 can be the first view presented to a user, the "Master Data Customizing" and the "System Configuration" are included in this view (instead of the business process view 302 in FIG. 3).

Upon selection of a specific business role, the "CRM Business Processes Used in Selected Business Roles" 404 screen is displayed. This screen can correspond to the main view 202 in FIG. 2. Upon another selection, the user is displayed the "Sales and Quotation Management" screen 406. In contrast to screen 304 in FIG. 3, screen 406 displays business document types 410 and item types 412. The displayed item types can include all the item types associated with documents in the list of business documents 410. In this illustration the "Standard Sales Order" 414 and "Standard Quote" 416 each only include one sales item.

In some implementations, selection of an item presents the user with the screen for the associated document type (e.g., screen 408). In some implementations, selection of an item presents the user with settings specific to the item. For example, in this illustration the "Partners" are not items but are customization settings specific to the standard sales order item 418. The Sales and Quotation Management screen 408 can offer a final level of customization, as screen 306 in FIG. 3.

Figure 5:
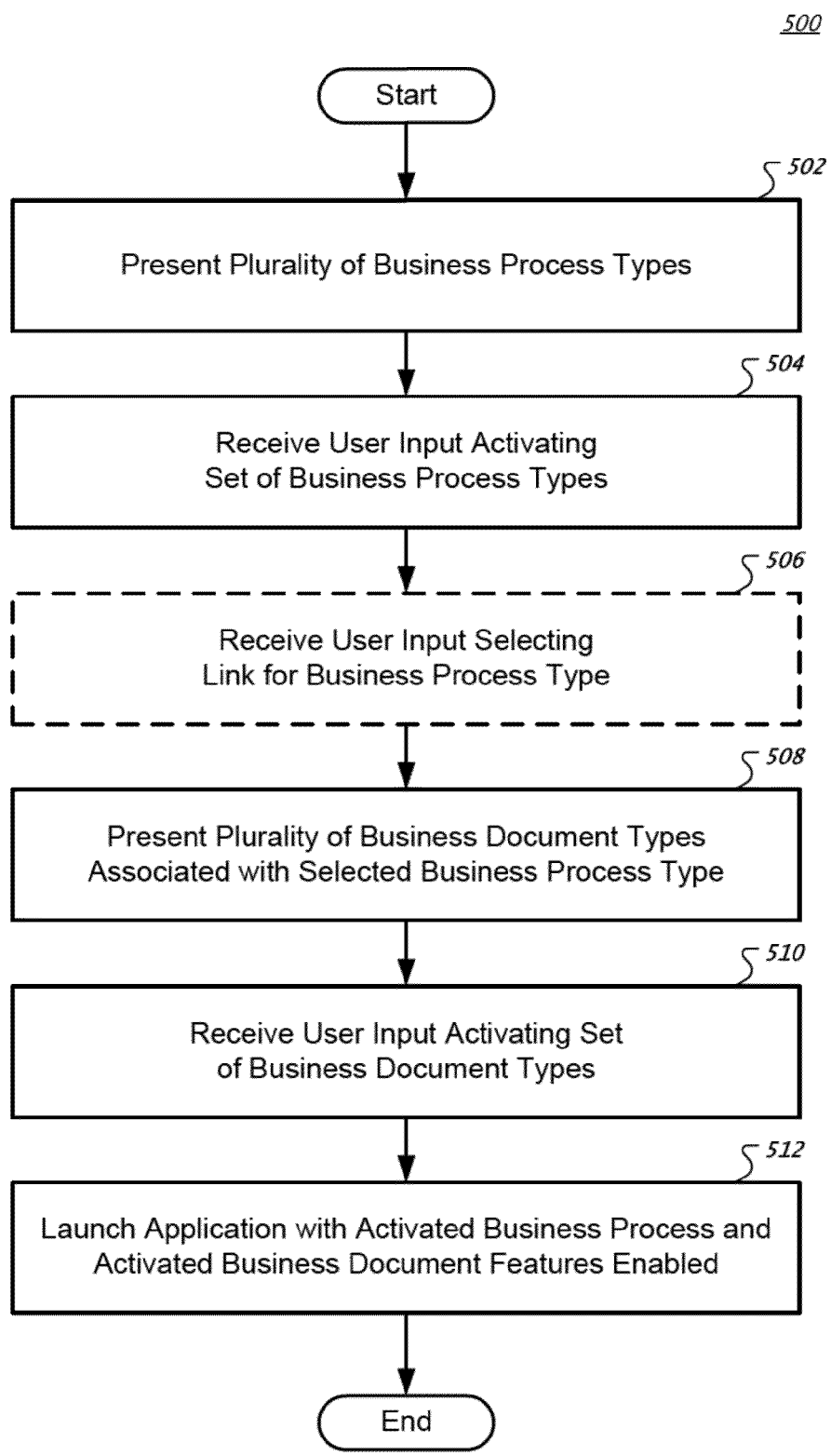
FIG. 5 is a flowchart of a process for managing customizing settings.

FIG. 5 is a flowchart of a process for managing customizing settings. A process 500 can be performed by a processor executing instructions stored in a computer-readable storage medium, for example in the system 100 (FIG. 1).

In step 502, a plurality of business process types are presented. As an illustration, screens 302 and 404 in FIGS. 3 and 4 are example displays of pluralities of business process types. The business process types can be all the business process types available for activation within an application program. Each of the business process types can be associated with a set of business document types.

In step 504, user input activating a set of the plurality of business process types is received. For example, the user input can include selecting the check boxes of some of the presented business process types. As an illustration, a subset of the business process types in screens 302 and 404 are selected. Each selection of the screen can trigger in an application program features that correspond to the selected business process type. The features can be activated upon receiving the user selection or at a later time when all activations in a customizing application are identified.

In optional step 506, user input selecting a link for one of the business process types is received. Upon the selection, a different display appears presenting the business document types for the selected business process type. The activation in step 504 and the selection in step 506 may be combined into one user input. For example, the business process types may not include a check box, but upon user selection of a business process link, the business process type is activated.

In step 508, a plurality of business document types associated with the selected business process type are presented. For example, upon the user selection of the link (as described in step 506), the display presenting the business processes can be replaced with a display of the business document types.

In step 510, user input activating a set of business document types from the plurality of presented business document types is received. For example, user input can include selecting the check boxes of some of the presented business document types. As an illustration, a subset of the business document types in screens 304 and 406 are selected. Each selection of the screen can trigger in the application program features that correspond to the selected business document type. The features can be activated upon receiving user selection or at a later time when all activations in the customizing have been received.

In step 512, an application program with enabled business process features and business document features is launched. For example, only the features associated with the activated business processes and activated business documents will be enabled. Business processes and documents that had an activation option but were not selected will not have their corresponding features enabled in the application program.

Figure 6:
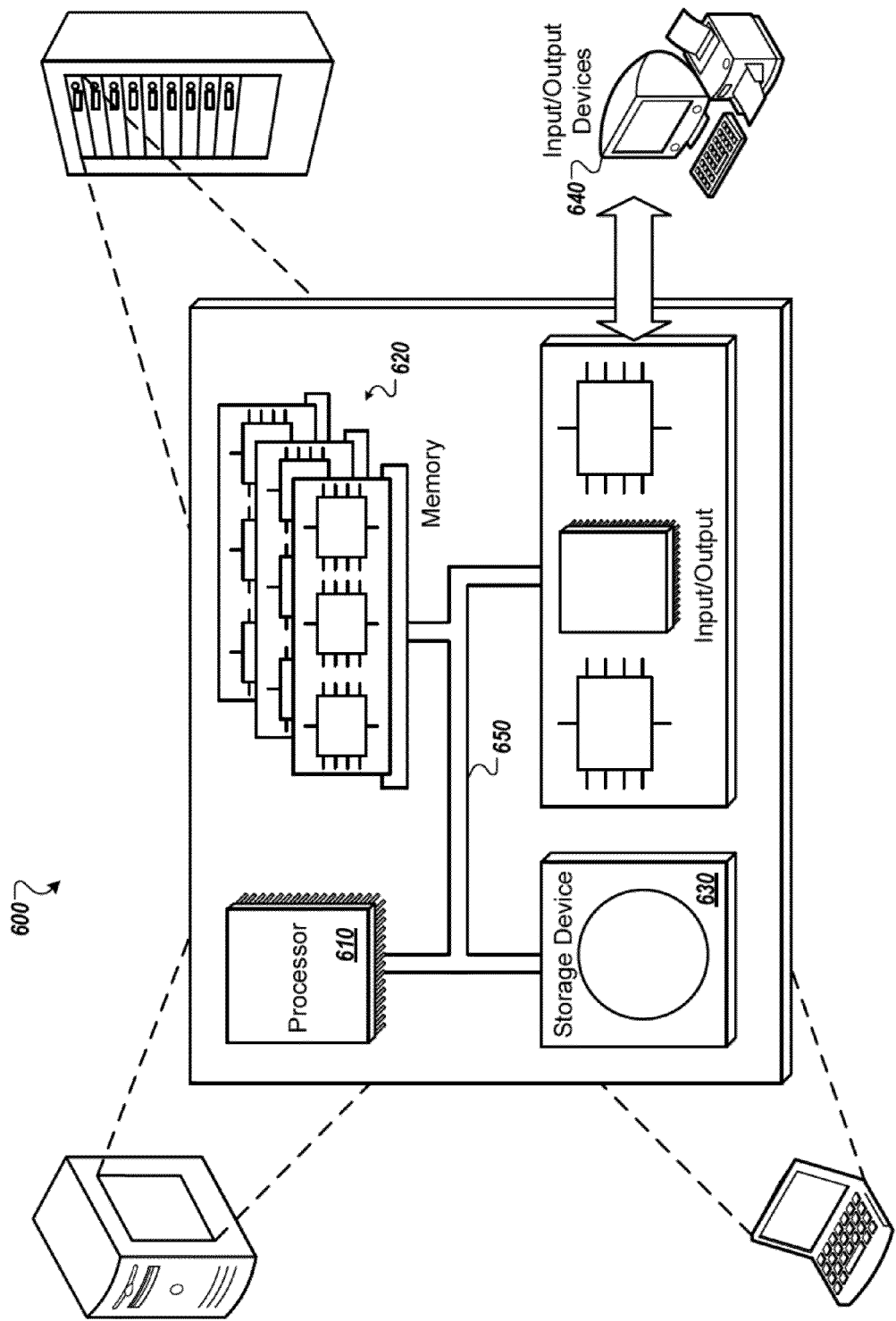
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer program product tangibly embodied in a computer-readable storage medium and comprising instructions that when executed by a processor perform a method for managing customizing settings for an application program, the method comprising:

presenting, in a computer system, a plurality of business process types to a user, each of the business process types being configured for execution in the computer system to perform a predefined business operation and comprising a plurality of business document types;

receiving a first user input selecting a set of business process types from the presented plurality of business process types, the first user input triggering a first level of modification, for each selected business process type, of settings in a customizing table accessed by the application program that are grouped for the selected business process type;

presenting, in response to the first selection, the plurality of business document types associated with the selected business process type;

receiving a second user input selecting a set of business document types from the presented plurality of business document types, the second user input triggering a second level of modification, for each selected business document type, of settings in the customizing table that are grouped for the selected business document type; and launching the application program in the computer system and in response to the first and second inputs, wherein the first and second corresponding features are activated and available during operation of the application program, and wherein other features not associated with at least one of the selected set of business process types and the selected set of business documents are not activated and are not available during the operation.

2. The computer program product of claim 1, wherein the method further comprises:

receiving a third user input of a selected business process type, the third user input initiating the presentation of the plurality of business document types; wherein the first user input includes selections of check boxes for the selected set of business process types and the third user input includes selection of a link for navigating to a presentation of the plurality of business document types for the selected business process type.

3. The computer program product of claim 2, wherein the link is activated for user-selection in response to selection of the checkbox associated with the selected business process.

4. The computer program product of claim 1, wherein the presentation of the plurality of business document types replaces the presentation of the plurality of business process types so that the plurality of business process types are no longer displayed to the user.

5. The computer program product of claim 1, wherein the set of business process types includes a single business process type.

6. The computer program product of claim 1, wherein the set of business document types includes a single business document type.

7. The computer program product of claim 1, wherein the modification of settings in the customizing table occurs after the selection of the set of business process types and in response to the receipt of a third user input that is not a selection of a business process type.

8. The computer program product of claim 1, wherein the business document type is a template for generation of a business document instance of the type by the application program in response to a user of the application program performing the predefined business operations of the business process associated with the business document.

9. The computer program product of claim 1, wherein each of the business documents comprises a plurality of tasks.

10. The computer program product of claim 9, wherein the method further comprises:

presenting, in response to the second user input, the plurality of tasks associated with the selected business document type;

receiving a third user input selecting a set of tasks from the presented plurality of tasks, the third user input triggering for each selected task activation of third corresponding features in the application program that are associated with the selected task; and launching the application program in the computer system and in response to the first, second, and third inputs, wherein the first, second, and third corresponding features are activated and available during operation of the application program, and wherein other features not associated with at least one of the selected set of business process types, selected set of business documents, and the selected set of tasks are not activated and are not available during the operation.

11. The computer program product of claim 1, wherein the method further comprises:

presenting, in response to the first selection, a plurality of tasks associated with the presented plurality of business document types, the plurality of tasks including one instance of all tasks associated with the plurality of business document types and not including duplicates of any tasks.

12. The computer program product of claim 1, wherein the method further comprises:

receiving a third user input de-selecting a set of business document types from the presented plurality of business document types, the deselected set of business document types initially activated by the first user input.

13. The computer program product of claim 1, wherein the method further comprises:

presenting, in the computer system, a plurality of business roles to the user, each of the business roles being associated with a plurality of the business process types, a business role associated with a group of users of the application program; and receiving a third user input selecting a set of business roles from the presented plurality of business roles;

wherein the presentation of the plurality of business process types is presented in response to receiving the third user input selecting the set of business roles.

14. A computer program product tangibly embodied in a computer-readable storage medium and comprising instructions that when executed by a processor perform a method for managing customizing settings for an application program, the method comprising:

presenting, in a computer system, a plurality of business process types to a user, each of the business process types being configured for execution in the computer system to perform a predefined business operation and comprising a plurality of business document types;

receiving a first user input selecting a set of business process types from the presented plurality of business processes types, the first user input triggering a first level of modification, for each selected business process type, of settings in a customizing table accessed by the application program that are grouped for the selected business process type;

presenting, in response to the first selection, the plurality of business document types associated with the selected business process type;

receiving a second user input selecting a set of business document types from the presented plurality of business document types, the second user input triggering a second level of modification, for each selected business document type, of settings in the customizing table that are grouped for the selected business document type; and launching the application program in the computer system and in response to the first and second inputs, wherein the first and second corresponding features are activated and available during operation of the application program, and wherein other features not associated with at least one of the selected set of business process types and the selected set of business documents are not activated and are not available during the operation.

15. The computer program product of claim 14, wherein each task comprises a plurality of settings that specify application program behavior related to the feature associated with the task, and wherein activation of the selected tasks' feature in the application program maintains the plurality of settings in corresponding customizing tables that specify the application program behavior related to the feature associated with the task.

16. The computer program product of claim 15, wherein the modification of settings in the customizing table occurs after the selection of the set of tasks and in response to the receipt of a forth user input that is not a selection of a task.

17. The computer program product of claim 14, wherein the method further comprises:
  presenting, in the computer system in a third display of the display device, a plurality of business roles to the user, each of the business roles being associated with a plurality of the business process types, a business role associated with a group of users of the application program; and
  receiving a third user input selecting a business role from the presented plurality of business roles;
  wherein the presentation of the plurality of business process types is presented in response to receiving the third user input selecting the business role, and
  wherein the presented plurality of business process types are the business process types associated with the selected business role.

18. The computer program product of claim 14, wherein the selected set of tasks includes a single task.

* * * * *